United States Patent
Chattopadhyay et al.

(10) Patent No.: US 9,922,263 B2
(45) Date of Patent: Mar. 20, 2018

(54) SYSTEM AND METHOD FOR DETECTION AND SEGMENTATION OF TOUCHING CHARACTERS FOR OCR

(71) Applicants: Tata Consultancy Services Limited, Maharashtra (IN); Indian Statistical Institute, Kolkata (IN)

(72) Inventors: Tanushyam Chattopadhyay, West Bengal (IN); Arpan Pal, West Bengal (IN); Aniruddha Sinha, West Bengal (IN); Utpal Garain, Kolkata (IN)

(73) Assignees: TATA CONSULTANCY SERVICES LIMITED (IN); INDIAN STATISTICAL INSTITUTE (IN)

(*) Notice: Subject to any disclaimer, the term of this patent is extended or adjusted under 35 U.S.C. 154(b) by 784 days.

(21) Appl. No.: 14/387,094

(22) PCT Filed: Mar. 20, 2013

(86) PCT No.: PCT/IN2013/000186
§ 371 (c)(1),
(2) Date: Sep. 22, 2014

(87) PCT Pub. No.: WO2013/164849
PCT Pub. Date: Nov. 7, 2013

(65) Prior Publication Data
US 2015/0086113 A1 Mar. 26, 2015

(30) Foreign Application Priority Data
Apr. 12, 2012 (IN) .......................... 1194/MUM/2012

(51) Int. Cl.
*G06K 9/00* (2006.01)
*G06K 9/34* (2006.01)

(52) U.S. Cl.
CPC ............ *G06K 9/344* (2013.01); *G06K 9/342* (2013.01); *G06K 9/348* (2013.01)

(58) Field of Classification Search
CPC ............................................ G06K 9/34–9/348
See application file for complete search history.

(56) References Cited

U.S. PATENT DOCUMENTS 4,365,234 A * 12/1982 Henrichon, Jr. ....... G06K 9/342
382/178
4,887,301 A * 12/1989 Hodgens ................. G06K 9/34
382/178

(Continued)

FOREIGN PATENT DOCUMENTS

WO 2011/080763 A1 7/2011

OTHER PUBLICATIONS

Lu, Yi; "Machine Printed Character Segmentation—An Overview", 1995.*

(Continued)

*Primary Examiner* — Aaron W Carter
(74) *Attorney, Agent, or Firm* — Hayes Soloway P.C.

(57) ABSTRACT

The present disclosure relates to a system and a method for detection of touching characters in a media, characterized by segmentation of adjoining character spaces. In the very first step, an aspect ratio is calculated for each connected component. A candidate touching position of each character is determined by calculating a threshold aspect ratio for each character. Further, a candidate cut column is determined based on a relation between column pixel densities and corresponding length thereof the column in order to segment the touching characters at the candidate cut column.

16 Claims, 2 Drawing Sheets

(56) References Cited

U.S. PATENT DOCUMENTS

| | | | |
|---|---|---|---|
| 5,048,097 A | 9/1991 | Gaborski et al. | |
| 5,761,344 A | 6/1998 | Al-Hussein et al. | |
| 5,768,414 A * | 6/1998 | Jamali | G06K 9/342 382/173 |
| 5,809,166 A * | 9/1998 | Huang | G06K 9/342 382/174 |
| 5,809,167 A | 9/1998 | Al-Hussein et al. | |
| 5,867,277 A | 2/1999 | Melen et al. | |
| 7,454,063 B1 | 11/2008 | Kneisl et al. | |
| 8,218,875 B2 | 7/2012 | Al-Omari et al. | |
| 9,471,990 B1 * | 10/2016 | Kumar | G06K 9/3266 |
| 2004/0146200 A1 * | 7/2004 | Andel | G06K 9/344 382/177 |
| 2004/0146216 A1 * | 7/2004 | Andel | G06K 9/342 382/277 |
| 2012/0242897 A1 * | 9/2012 | Chattopadhyay | G06K 9/325 348/467 |
| 2013/0272607 A1 * | 10/2013 | Chattopadhyay | G06K 9/344 382/171 |
| 2015/0302598 A1 * | 10/2015 | Collet | G06T 7/0079 382/178 |
| 2016/0034773 A1 * | 2/2016 | Goncalves | G06K 9/18 382/103 |
| 2017/0161580 A1 * | 6/2017 | Chulinin | G06K 9/3208 |

OTHER PUBLICATIONS

Lu, Yi; "On the Segmentation of Touching Characters", IEEE, 1993.*

Mudit Agrawal, "Re-targetable OCR with intelligent character segmentation", Language and Media Processing Laboratory Institute of Advanced Computer Studies University of Maryland, Dec. 10, 2010.

Toshio Sato, Takeo Kanade, Ellen K. Hughes, Michael A. Smith, Shin'Ichi Satoh, "Video OCR: Indexing Digital News Libraries by Recognition of Superimposed Caption", School of Computer Science, Carnegie Mellon University, 1999.

* cited by examiner

SYSTEM AND METHOD FOR DETECTION AND SEGMENTATION OF TOUCHING CHARACTERS FOR OCR

FIELD OF THE DISCLOSURE

The present disclosure in general relates to method and system for character identification. More particularly, the disclosure relates to a method and system for detection of touching characters in a text output obtained from videos and images.

BACKGROUND OF THE DISCLOSURE

Optical Character Recognition (OCR) is the mechanical or electronic conversion of scanned images of handwritten, typewritten or printed text into machine-encoded text. Touching characters are always difficult to be recognized by an OCR engine. The binarized output of a TV video frame includes various noises like salt and pepper noise which represents itself as randomly occurring white and black pixels. Thus, there is a high possibility of false detection of characters due to the presence of this type of noise.

There are various methods available for touching character segmentation of texts obtained from videos. The main limitation of the available methods is that it cannot perform well for all text rich videos in the corpus. The existing method assumes that all characters are of almost equal width and thus the candidate cutting positions are not properly obtained thereby leading to an over segmented character. The existing methods consist of a possibility of segmentation at the left/right extension portion of the characters like "T" or "E". Moreover, the inventions are related to texts obtained from videos only.

Therefore, there is a need of a suitable touching character segmentation method which would help in improving the recognition accuracy of an OCR engine by calculating the exact touching position and segmenting the touching characters at that point only. Also, the method should be capable of being applied to text output obtained from both images and videos.

OBJECTS OF THE DISCLOSURE

It is the primary object of the disclosure to provide a system and method for detection of touching characters in a media.

It is another object of the disclosure to provide a system and method for accurately determining the candidate cut column for those of the detected touching characters.

It is yet another object of the disclosure to provide a system and method for segmenting the touching characters with referential boundary thereof the candidate cut column in the component.

SUMMARY OF THE DISCLOSURE

The present disclosure provides a method for detection of touching characters in a media by segmentation of adjoining character spaces. The method comprises of processor implemented steps of: acquiring each component of the media in a predetermined sequence, each component having at least two touching characters; determining an aspect ratio of each component; and performing a component investigation for each aspect ratio higher than a threshold aspect ratio, the component investigation comprising: determining a candidate touching position of the at least two touching characters in a plurality of geometric orientation of the at least two touching characters; computing a number of pixels representing a text of the at least two touching characters; computing a length of a longest run of the number of pixels representing the text of the at least two touching characters for each column of the component; determining a candidate cut column based on a relation between a column pixel density and a corresponding length of the column; and segmenting the at least two touching characters with a referential boundary of the candidate cut column in the component.

The present disclosure also provides a system for detection of touching characters in a media by segmentation of adjoining character spaces. The system comprises an input device configured to acquire each component of the media in a predetermined sequence, each component having at least two touching characters. A processor is configured to determine an aspect ratio of each component, wherein the processor performs a component investigation for each aspect ratio higher than a threshold aspect ratio, wherein the processor: determines a candidate touching position of the at least two touching characters in a plurality of geometric orientations of the characters; computes a number of pixels representing a text of the at least two touching characters; computes a length of a longest run of the number of pixels representing the text of the at least two touching characters for each column of the component; determines a candidate cut column based on a column pixel density and a corresponding length of the column; and segments the at least two touching characters with a referential boundary of the candidate cut column in the component.

The present disclosure also provides a computerized system for detection of touching characters in media by segmentation of adjoining character spaces. At least one media article has a plurality of components, wherein at least a portion of the plurality of components has at least two touching characters. A computerized device receives the at least one media article through at least one input device, wherein at least a portion of the plurality of components is acquired through the input device in a predetermined sequence, wherein the computerized device has a non-transient memory and a processor, the processor capable of executing a plurality of code stored on the non-transient memory, wherein the plurality of code further comprises: code for determining an aspect ratio of each component; code for performing a component investigation for each aspect ratio higher than a threshold aspect ratio; code for determining a candidate touching position of the at least two touching characters in a plurality of geometric orientations of the characters; code for computing a number of pixels representing a text of the at least two touching characters; code for computing a length of a longest run of the number of pixels representing the text of the at least two touching characters for each column of the component; code for determining a candidate cut column based on a column pixel density and a corresponding length of the column; and code for segmenting the at least two touching characters with a referential boundary of the candidate cut column in the component.

DETAILED DESCRIPTION

Some embodiments of this disclosure, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present disclosure, the preferred, systems and parts are now described. In the following description for the purpose of explanation and understanding reference has been made to numerous embodiments for which the intent is not to limit the scope of the disclosure.

One or more components of the disclosure are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the disclosure, which may be embodied in various forms.

The present disclosure relates to a system and a method for detection of touching characters in a media. The detection of touching characters is further characterized by segmentation of adjoining character spaces. In the first step, an aspect ratio is calculated for each connected component. A candidate touching position of each character is determined by calculating a threshold aspect ratio for each character. Further a candidate cut column is determined based on a relation between column pixel densities and corresponding length thereof the column. Lastly, the touching characters segmented with referential boundary thereof the candidate cut column.

Figure 1:
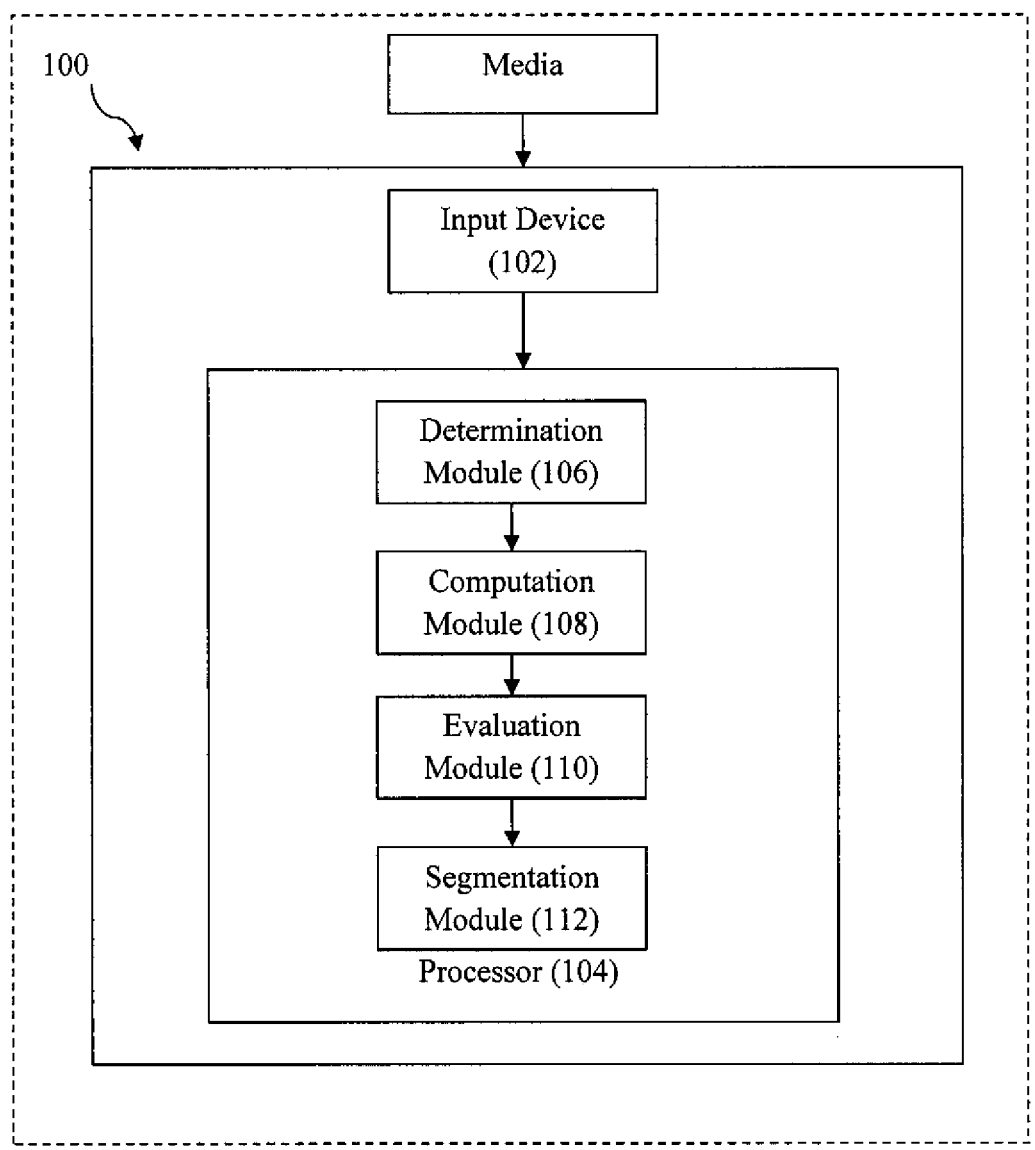
FIG. 1 illustrates the system architecture in accordance with an embodiment of the disclosure.

In accordance with an embodiment, referring to FIG. 1, the system (100) comprises of an input device (102) which is configured to acquire each component of media in a predetermined sequence. The system (100) further comprises of a processor (104) which processes the component of media for component investigation. The processor (104) further comprises a determination module (106), a computation module (108), an evaluation module (110) and segmentation module (112).

The system (100) may include at least one processor (104), an input/output (I/O) interface such as input device (102), and a memory. The at least one processor (104) may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the system to interact with a user directly or through the user devices. Further, the I/O interface may enable the system (100) to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, non-transient memories, flash memories, hard disks, optical disks, and magnetic tapes. The memory may include modules and system data.

In accordance with an embodiment, still referring to FIG. 1, an input module (102) acquires each component of media in a predetermined sequence wherein the media includes images captured from camera, scanned images or videos. The processor (104) is further configured to determine the aspect ratio thereof each component (as shown in step 202 of FIG. 2).

The processor (104) further comprises of a binarization module (not shown in the figure) which binarizes the media before determining the aspect ratio. The aspect ratio is calculated as, $$\text{Aspect Ratio }(A) = w/h$$

Where, w=width of the component and h=height of the component

The processor (104) further comprises of a determination module (106) which is configured to determine a candidate touching characters in a plurality of geometric orientation of the characters therein the component. The candidate touching characters in a component is determined by comparing the aspect ratio of that component with a threshold aspect ratio (as shown in step 204 of FIG. 2).

In accordance with an embodiment, by way of a specific example, the value of the threshold aspect ratio is 1. Therefore, A component is a candidate touching character if, $$\text{Aspect Ratio }(A) > 1$$

Figure 2:
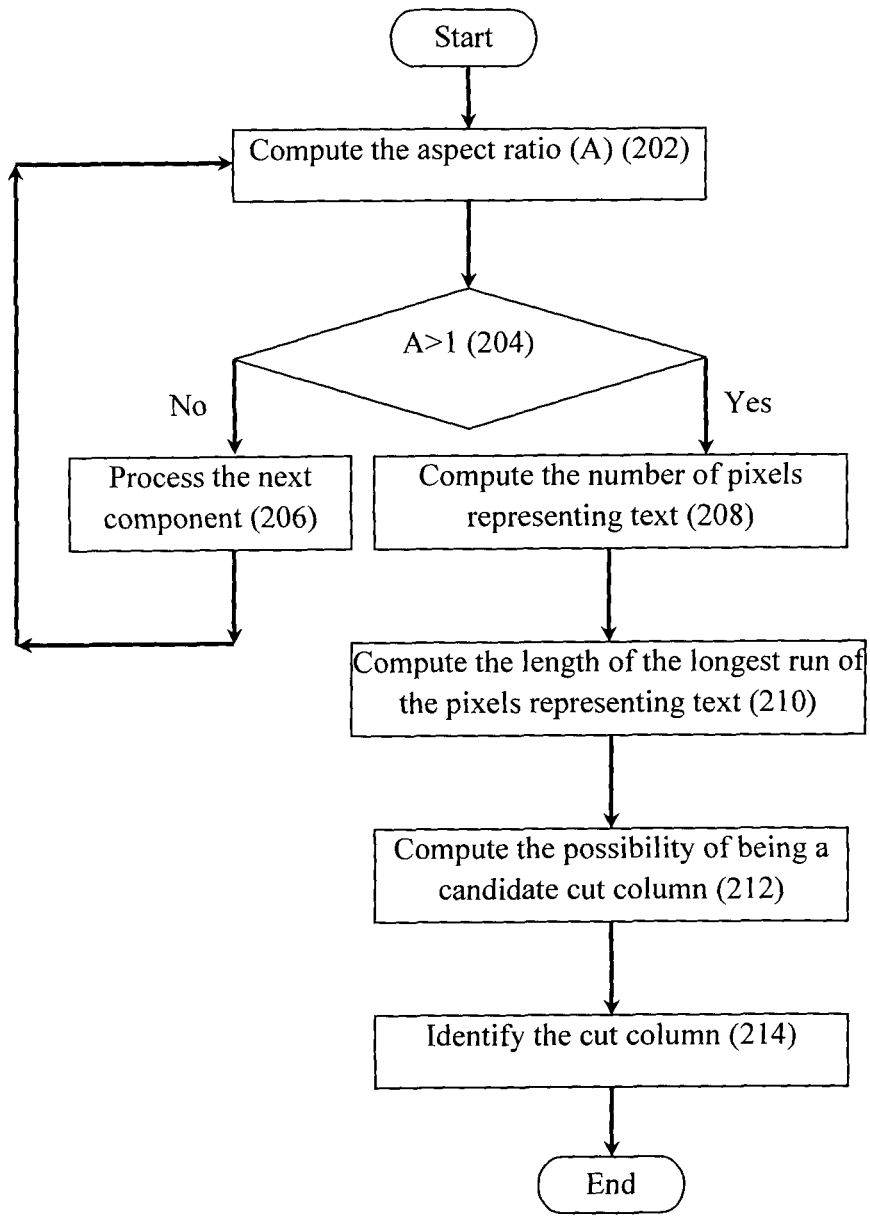
FIG. 2 illustrates an exemplary flowchart in accordance with another embodiment of the disclosure.

If the aspect ratio is not greater than 1 then the component is not considered as a candidate touching character and the next component from the input is considered for processing (as shown in step 206 of FIG. 2).

The processor (104) further comprises of a computation module (108) which is configured to compute number of pixels representing text (as shown in step 208 of FIG. 2) and the length of a longest run of the pixel representing the text (as shown in step 210 of FIG. 2), for each column of the component. The number of pixels representing text (cnt_txt) and the length of the longest run of the pixels representing text (longest_txt) are calculated for each column of a candidate touching character.

The processor further comprises of an evaluation module (110) which is configured to determine a candidate cut column. A feature τ is defined which indicates the possibility of the i$^{th}$ column being a candidate cut column as, $\tau_i$=cnt_txt*longest_txt (as shown in step 212 of FIG. 2)

A column is marked as a candidate cut column if the following condition is satisfied:

$\tau_{i+1} > \tau_i \le \tau_{i-1}$ and $\tau_i$<threshold (as shown in step 214 of FIG. 2)

The threshold value is obtained heuristically. By way of a specific example, the threshold value in case of Indian TV videos is 10.

The processor (104) further comprises of a segmentation module (112) which is configured to segment the touching characters with referential boundary thereof the candidate cut column in the component.

BEST MODE/EXAMPLE FOR WORKING OF THE DISCLOSURE

The system and method illustrated for detection of touching characters in a media, characterized by segmentation of adjoining character spaces, to be interpreted further for a specific purpose may be illustrated by working examples stated in the following paragraph; the process is not restricted to the said examples only:

Let us consider an image captured from a running video of a Bollywood movies include a text showing name of a movie. When the image is captured it is affected by a plurality of noises (shadow of other objects etc) and the characters are seemed to be overlapped. This image if video being processed OCR (Optical character recognition) is first being enhanced by the above described system and method.

The aspect ratio is first determined and is compared to a threshold value (for example 1). If this aspect ratio is greater than 1, then it is processed for further investigation. In the further investigation candidate touching position are determined in a plurality of geometric orientations.

Further out the complete image area, the numbers of pixels which are representing text are computed and then the length of a longest run of pixel representing the text for each column of the component is computed.

Considering the product of the number of pixels representing text and the length of longest run of text pixel, candidate cut column are determined. Lastly, the touching characters are being segmented with referential boundary thereof the column before being processed by the OCR for identification of the movie name.

We claim:

1. A method for detection of touching characters in a media by segmentation of adjoining character spaces, the method comprising:
   acquiring each component of the media in a predetermined sequence, each component having at least two touching characters;
   determining an aspect ratio of each component; and
   performing a component investigation for each aspect ratio higher than a threshold aspect ratio, the component investigation comprising:
      determining a candidate touching position of the at least two touching characters in a plurality of geometric orientations of the at least two touching characters;
      computing a number of pixels representing a text of the at least two touching characters;
      computing a length of a longest run of the number of pixels representing the text of the at least two touching characters for each column of the component;
      determining a candidate cut column based on a relation between a column pixel density and a corresponding length of the column; and
      segmenting the at least two touching characters with a referential boundary of the candidate cut column in the component.

2. The method of claim 1, wherein the media includes images captured from at least one of a camera, scanned images, and videos.

3. The method of claim 1, wherein the media is binarized before the aspect ratio of each component is determined.

4. The method of claim 1, wherein a value of the threshold aspect ratio is 1.

5. The method of claim 1, wherein the relation between the column pixel density and the corresponding length of the column includes a product of the number of pixels representing the text of the at least two touching characters and the length of longest run of the number of pixels.

6. The method of claim 1, wherein the aspect ratio is determined by dividing a width of the component by a height of the component.

7. A system for detection of touching characters in a media by segmentation of adjoining character spaces, the system comprising:
   an input device configured to acquire each component of the media in a predetermined sequence, each component having at least two touching characters; and
   a processor configured to determine an aspect ratio of each component, wherein the processor performs a component investigation for each aspect ratio higher than a threshold aspect ratio, wherein the processor:
      determines a candidate touching position of the at least two touching characters in a plurality of geometric orientations of the characters;
      computes a number of pixels representing a text of the at least two touching characters;
      computes a length of a longest run of the number of pixels representing the text of the at least two touching characters for each column of the component;
      determines a candidate cut column based on a column pixel density and a corresponding length of the column; and
      segments the at least two touching characters with a referential boundary of the candidate cut column in the component.

8. The system of claim 7, wherein the media includes images captured from at least one of a camera, scanned images, and videos.

9. The system of claim 7, wherein a value of the threshold aspect ratio is 1.

10. The system of claim 7, wherein the processor binarizes the media before determining the aspect ratio of each component.

11. The system of claim 7, wherein the aspect ratio is determined by dividing a width of the component by a height of the component.

12. A computerized system for detection of touching characters in media by segmentation of adjoining character spaces, the system comprising:
   at least one media article having a plurality of components, wherein at least a portion of the plurality of components has at least two touching characters; and
   a computerized device receiving the at least one media article through at least one input device, wherein at least a portion of the plurality of components is acquired through the input device in a predetermined sequence, wherein the computerized device has a non-transient memory and a processor, the processor capable of executing a plurality of code stored on the non-transient memory, wherein the plurality of code further comprises:

code for determining an aspect ratio of each component;

code for performing a component investigation for each aspect ratio higher than a threshold aspect ratio;

code for determining a candidate touching position of the at least two touching characters in a plurality of geometric orientations of the characters;

code for computing a number of pixels representing a text of the at least two touching characters;

code for computing a length of a longest run of the number of pixels representing the text of the at least two touching characters for each column of the component;

code for determining a candidate cut column based on a column pixel density and a corresponding length of the column; and code for segmenting the at least two touching characters with a referential boundary of the candidate cut column in the component.

13. The computerized system of claim 12, wherein the at least one media article includes images captured from at least one of a camera, scanned images, and videos.

14. The computerized system of claim 12, wherein a value of the threshold aspect ratio is 1.

15. The computerized system of claim 12, further comprising code for binarizing the at least one media article before determining the aspect ratio of each of the plurality of components acquired through the input device.

16. The computerized system of claim 12, wherein the aspect ratio is determined by dividing a width of the component by a height of the component.

* * * * *